US012131520B2

(12) United States Patent
Li et al.

(10) Patent No.: US 12,131,520 B2
(45) Date of Patent: Oct. 29, 2024

(54) METHODS, DEVICES, AND COMPUTER READABLE STORAGE MEDIA FOR IMAGE PROCESSING (71) Applicant: NEC CORPORATION, Tokyo (JP)

(72) Inventors: Yan Li, Beijing (CN); Ni Zhang, Beijing (CN)

(73) Assignee: NEC CORPORATION, Tokyo (JP)

(*) Notice: Subject to any disclaimer, the term of this patent is extended or adjusted under 35 U.S.C. 154(b) by 383 days.

(21) Appl. No.: 17/561,256

(22) Filed: Dec. 23, 2021

(65) Prior Publication Data
US 2022/0207861 A1 Jun. 30, 2022

(30) Foreign Application Priority Data
Dec. 25, 2020 (CN) .......................... 202011563588.3

(51) Int. Cl.
G06V 10/764 (2022.01)
G06V 10/26 (2022.01)
(Continued)

(52) U.S. Cl.
CPC ............ *G06V 10/764* (2022.01); *G06V 10/26* (2022.01); *G06V 10/761* (2022.01); *G06V 20/70* (2022.01)

(58) Field of Classification Search
CPC ...... G06V 10/74; G06V 10/764; G06V 10/26; G06V 10/761; G06V 20/70; G06V 10/25;
(Continued)

(56) References Cited

U.S. PATENT DOCUMENTS 10,540,757 B1* 1/2020 Bouhnik ................... G06T 3/14
10,635,927 B2* 4/2020 Chen ...................... G06V 10/82
(Continued)

FOREIGN PATENT DOCUMENTS

| CN | 111275080 A | 6/2020 |
| JP | 2010-262350 A | 11/2010 |
| JP | 2020-534594 A | 11/2020 |

OTHER PUBLICATIONS

Notification of Reasons for Refusal dated Jun. 6, 2023 in Japanese Application No. 2021-209889.

Primary Examiner — Edward F Urban
Assistant Examiner — Benedict E Lee
(74) Attorney, Agent, or Firm — Sughrue Mion, PLLC (57) ABSTRACT Embodiments of the present disclosure relate to methods, devices and computer-readable storage medium for image processing. A method for image processing comprises obtaining a plurality of images, each of the plurality of images having an initial semantic segmentation label indicating a semantic class of a pixel in the each image; obtaining a plurality of image masks corresponding to the plurality of images, each of the plurality of image masks being used for selecting a target region in a corresponding image of the plurality of images; regenerating respective semantic segmentation labels of the plurality of images based on the plurality of image masks and initial semantic segmentation labels of the plurality of images; and generating a mixed image and a semantic segmentation label of the mixed image based on the plurality of images and the regenerated respective semantic segmentation labels. By using the generated mixed image and its semantic segmentation label as training data to train an image semantic segmentation model, it helps to reduce the redundant learning on easy training samples for the model and mitigate the (Continued)

model overfitting problem, thereby enhancing the model performance.

18 Claims, 6 Drawing Sheets

(51) Int. Cl.
*G06V 10/74* (2022.01)
*G06V 20/70* (2022.01)

(58) Field of Classification Search
CPC ...... G06V 10/82; G06V 10/774; G06F 16/58; G06F 16/5866; G06F 16/55; G06T 7/11
See application file for complete search history.

(56) References Cited

U.S. PATENT DOCUMENTS

| | | | |
|---|---|---|---|
| 10,929,977 B2 * | 2/2021 | Wang | G06N 3/08 |
| 11,127,139 B2 * | 9/2021 | Zhang | G06T 7/11 |
| 11,341,736 B2 * | 5/2022 | Zhang | G06V 10/757 |
| 11,636,602 B1 * | 4/2023 | Havír | G06V 10/774 |
| | | | 382/164 |
| 2019/0392268 A1 | 12/2019 | Tariq et al. | |
| 2020/0294242 A1 | 9/2020 | Veni et al. | |
| 2021/0158098 A1 * | 5/2021 | Shimizu | G06T 7/11 |

* cited by examiner

METHODS, DEVICES, AND COMPUTER READABLE STORAGE MEDIA FOR IMAGE PROCESSING

TECHNICAL FIELD

Embodiments of the present disclosure relate to the field of image processing, and more specifically, to methods, devices and computer-readable storage medium for image processing.

BACKGROUND

Image semantic segmentation is an important technology in the field of image processing and computer vision, which is the basis of image understanding. Image semantic segmentation refers to classifying each pixel in an image and determining a semantic class (such as belonging to background, person or vehicle, etc.) of each pixel, to divide regions of the image according to different semantic classes.

Usually, an image semantic segmentation model (e.g., deep neural network) may be trained based on a training dataset to realize image semantic segmentation. Deep neural networks have strong nonlinear fitting capability and can be trained to process complex tasks. However, this feature of the deep neural networks is easy to cause overfitting problems. That is, the trained model overfits the training dataset and underperforms in other datasets.

SUMMARY

Embodiments of the present disclosure provide methods, devices and computer readable storage medium for image processing.

In a first aspect of the present disclosure, there is provided a method for image processing. The method comprises: obtaining a plurality of images, each of the plurality of images having an initial semantic segmentation label indicating a semantic class of a pixel in the each image; obtaining a plurality of image masks corresponding to the plurality of images, each of the plurality of image masks being used for selecting a target region in a corresponding image of the plurality of images; regenerating respective semantic segmentation labels of the plurality of images based on the plurality of image masks and initial semantic segmentation labels of the plurality of images; and generating a mixed image and a semantic segmentation label of the mixed image based on the plurality of images and the regenerated respective semantic segmentation labels.

In a second aspect of the present disclosure, there is provided a method for model training. The method comprises: obtaining training data, the training data comprising a mixed image and a semantic segmentation label of the mixed image; and training an image semantic segmentation model based on the training data for generating a semantic segmentation label of a target image.

In a third aspect of the present disclosure, there is provided a method for image processing. The method comprises: obtaining an input image; and generating a semantic segmentation label of the input image using an image semantic segmentation model trained according to the second aspect of the present disclosure.

In a fourth aspect of the present disclosure, there is provided a computing device. The computing device comprises at least one processor, configured to: obtain a plurality of images, each of the plurality of images having an initial semantic segmentation label indicating a semantic class of a pixel in the each image; obtain a plurality of image masks corresponding to the plurality of images, each of the plurality of image masks being used for selecting a target region in a corresponding image of the plurality of images; regenerate respective semantic segmentation labels of the plurality of images based on the plurality of image masks and initial semantic segmentation labels of the plurality of images; and generate a mixed image and a semantic segmentation label of the mixed image based on the plurality of images and the regenerated respective semantic segmentation labels.

In a fifth aspect of the present disclosure, there is provided a computing device. The computing device comprises at least one processor, configured to: obtain training data, the training data comprising a mixed image and a semantic segmentation label of the mixed image; and train an image semantic segmentation model based on the training data for generating a semantic segmentation label of a target image.

In a sixth aspect of the present disclosure, there is provided a computing device. The computing device comprises at least one processor, configured to: obtain an input image; and generate a semantic segmentation label of the input image using an image semantic segmentation model trained according to the second aspect of the present disclosure.

In a seventh aspect of the present disclosure, there is provided a computer-readable storage medium. The computer-readable storage medium comprises machine-executable instructions stored thereon which, when being executed by a device, cause the device to perform any step of the method according to the first, second or third aspect of the present disclosure.

In an eighth aspect of the present disclosure, there is provided a computer program product. The computer program product is tangibly stored in a computer-readable storage medium and comprises machine-executable instructions which, when being executed by a device, cause the device to perform any step of the method according to the first, second or third aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure. Other features of the present disclosure will become easy to understand from the description below.

BRIEF DESCRIPTION OF THE DRAWINGS

Through the following disclosure and claims, the objects, advantages and other features of the present invention will become more apparent. For the illustration purpose only, non-limiting description of preferable embodiments is provided with reference to the accompanying drawings, wherein:

Throughout the figures, the same or corresponding numerals denote the same or corresponding parts.

DETAILED DESCRIPTION OF EMBODIMENTS

The embodiments will be described in more detail with reference to the accompanying drawings, in which some embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art. It should be understood that the drawings and embodiments of the present disclosure are only used for illustration, rather than limiting the protection scope of the present disclosure.

The terms "comprise" and its variants used herein are to be read as open terms that mean "include, but is not limited to." The term "based on" is to be read as "based at least in part on". The term "one embodiment" or "the embodiment" is to be read as "at least one embodiment." The terms "first," "second" and the like may refer to different or the same objects. Other definitions, explicit and implicit, might be included below.

The term "circuitry" used herein may refer to hardware circuits and/or combinations of hardware circuits and software. For example, the circuitry may be a combination of analog and/or digital hardware circuit(s) with software/firmware. As another example, the circuitry may be any portions of hardware processor(s) with software (including digital signal processor(s)), software, and memory(ies) that work together to cause a device to perform various functions. In a further example, the circuitry may be hardware circuit(s) and or processor(s), such as a microprocessor(s) or a portion of a microprocessor(s), that requires software/firmware for operation, but the software may not be present when it is not needed for operation. The term "circuitry" used herein also covers an implementation of merely a hardware circuit or a processor, or a portion of a hardware circuit or a processor, and its (or their) accompanying software and/or firmware.

As described above, the image semantic segmentation model (e.g., deep neural network) is usually trained based on a training dataset to realize image semantic segmentation. Deep neural networks have strong nonlinear fitting capability and can be trained to process complex tasks. However, this feature of deep neural networks is easy to cause overfitting problems. That is, the trained model overfits to the training dataset and underperforms in other datasets.

Usually, a regularization operation can prevent the model from being overfitting to the training dataset or over-confident about its prediction results. For example, a mixup operation is a method for image augmentation which is commonly used in computer vision. It may mix up different images, thereby augmenting the training dataset. The mixup operation may be regarded as a regularization operation, which adds regular terms to the model or prunes the model in the form of data augmentation. However, for pixel-wise prediction problems like image semantic segmentation, standard regularization operations do not bring significant improvements. This is because that those pixel-wise prediction problems require complex feature space, which will cause the efficiency of the model training to reduce and even be difficult to converge.

Embodiments of the present disclosure propose a solution for image processing to solve the above and/or other potential problems. The solution obtains a plurality of images, wherein each image has a semantic segmentation label indicating a semantic class of a pixel in the image. The solution obtains a plurality of image masks corresponding to the plurality of images, wherein each image mask is used for selecting a target region in a corresponding image of the plurality of images. The solution regenerates corresponding semantic segmentation labels of the plurality of images based on the plurality of image masks and initial semantic segmentation labels of the plurality of images. Then, the solution generates a mixed image and a semantic segmentation label of the mixed image based on the plurality of images and the regenerated corresponding semantic segmentation labels.

In this way, the solution can select pixels with higher contributions from the plurality of images for mixing up. By using the generated mixed image and its semantic segmentation label as training data to train the image semantic segmentation model, it helps to reduce the redundant learning on simple training samples for the model. Furthermore, by introducing disturbances into training samples, it helps to mitigate the model overfitting problem and thereby enhance the model performance.

Embodiments of the present disclosure will be described in detail with reference to the accompanying drawings. As used herein, the term "model" can handle inputs and provide corresponding outputs. Take a neural network model as an example, it usually includes an input layer, an output layer and one or more hidden layers between the input and output layers. The model (also referred to as "deep learning model") used in the deep learning applications usually includes a plurality of hidden layers to extend the depth of the network. Individual layers of the neural network model are connected in sequence, such that an output of a preceding layer is provided as an input for a following layer, where the input layer receives the input of the neural network while the output of the output layer acts as the final output of the neural network. Each layer of the neural network model includes one or more nodes (also referred to as processing nodes or neurons) and each node processes the input from the preceding layer. In the text, the terms "neural network," "model," "network" and "neural network model" may be used interchangeably.

Figure 1:
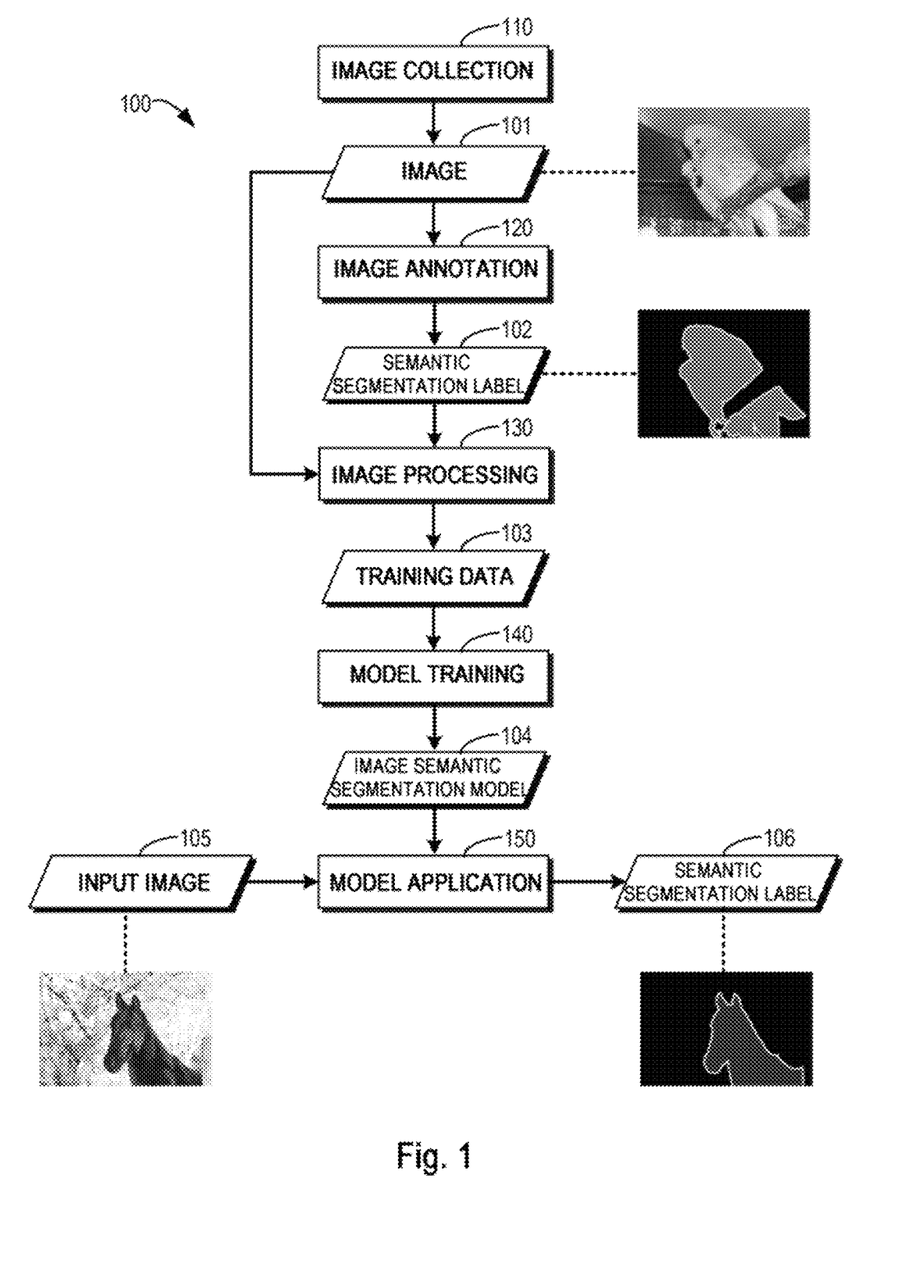
FIG. 1 shows a schematic block diagram of an image processing system according to embodiments of the present disclosure.

FIG. 1 shows a schematic block diagram of an image processing system 100 according to embodiments of the present disclosure. As shown in FIG. 1, the system 100 may comprise an image collection apparatus 110, an image annotation apparatus 120, an image processing apparatus 130, a model training apparatus 140 and a model application apparatus 150. In some embodiments, the above multiple apparatuses may be implemented in different physical equipment. Alternatively, at least a portion of the above multiple apparatuses may be implemented in the same physical equipment. It is to be understood that the system 100 shown in FIG. 1 is merely one example in which embodiments of the present disclosure may be implemented, and not intended to limit the scope of the present disclosure. Embodiments of the present disclosure are also applicable to other systems or architectures.

The image collection apparatus 110 may collect a set of images 101 for training a model. It is to be understood that an image in the set of images 101 may be an image in any format. In addition, the image collection apparatus 110 may collect the set of images 101 by using any method that is known or will be developed in future. The scope of the present disclosure is not limited in this regard.

The image annotation apparatus 120 may generate a semantic segmentation label 102 for each image 101 to indicate the semantic class of each pixel in the image. The semantic class of a pixel refers to the class of an object corresponding to the pixel in the image. Objects in the image may include but not limited to, background, persons, animals, vehicles, etc. For example, the generated semantic segmentation label may be a vector or an array indicating the true semantic class of each pixel, or may be a visual image as shown in FIG. 1, wherein pixels belonging to different semantic classes may be identified by different colors. It is to be understood that image annotation may be done manually. In such case, the image annotation apparatus 120 may be an apparatus or a device that is manually controlled to annotate each pixel in each image 101.

The set of images 101 and corresponding semantic segmentation labels 102 may be provided to the image processing apparatus 130. The image processing apparatus 130 may obtain a plurality of images 101 from the set of images 101, wherein each image 101 is annotated with its corresponding semantic segmentation label 102. As used herein, the "semantic segmentation label 102" is also referred to as "initial semantic label". The image processing apparatus 130 may obtain a plurality of image masks corresponding to the plurality of images 101, each of the plurality of image masks being used to select a target region in the corresponding image 101. The target region may comprise a plurality of pixels in the image 101 whose semantic classes are difficult to predict, i.e., those pixels with higher contributions to the training of the image semantic segmentation model. The image processing apparatus 130 may regenerate semantic segmentation labels of the plurality of images 101 based on the plurality of image masks and the initial semantic segmentation labels 102 of the plurality of images. For example, for the corresponding initial semantic segmentation label 102 of each image 101, the image processing apparatus 130 may, by performing a masking operation (i.e., point multiplication) on the image mask and the initial semantic segmentation label 102, select the portion of the initial semantic segmentation labels 102 corresponding to those pixels in the target region and ignore the portion corresponding to those pixels in the non-target region. Then, the image processing apparatus 130 may generate a mixed image and a semantic segmentation label of the mixed image as a training sample in a training dataset 103 based on the plurality of images 101 and the regenerated respective semantic segmentation labels. In addition or alternatively, the image processing apparatus 130 may also use each original image 101 and its corresponding initial semantic segmentation label 102 as a training sample in the training dataset 103. In this way, the image processing apparatus 130 may generate the training dataset 103 that comprises a plurality of training samples. It is to be understood that the training dataset 103 may only comprise a training sample formed by a mixed image and its semantic segmentation label, or only comprise a training sample formed by an original image and its semantic segmentation label, or comprise both of the above.

The training dataset 103 may be provided to the model training apparatus 140 to be used for training an image semantic segmentation model 104. The image semantic segmentation model 104 may be trained to predict the semantic class of each pixel in an image which is input to the image semantic segmentation model. For example, the model training apparatus 140 may perform model training based on the training dataset 103 to determine a model parameter of the image semantic segmentation model 104. The trained image semantic segmentation model 104 (e.g., the determined model parameter) may be provided to the model application apparatus 150. The model application apparatus 150 may obtain an input image 105 and predict the semantic class of each pixel in the input image 105 by using the trained image semantic segmentation model 104. The model application apparatus 150 may generate a semantic segmentation label 106 indicating the input image 105 based on a prediction result. For example, the generated semantic segmentation label 106 may be a vector or an array that indicates the semantic class of each pixel in the input image 105, or may be a visual image as shown in FIG. 1, wherein pixels of different semantic classes may be filled with different colors.

The image semantic segmentation model 104 may be applied to various fields. In the medical field, the image semantic segmentation model can perform semantic segmentation for various input medical images, thereby recognizing and understanding lesions therein to help doctors to diagnose diseases. For example, a method for processing a medical image may comprise: obtaining an input medical image; generating a semantic segmentation label of the medical image using a trained image semantic segmentation model, wherein the semantic segmentation label indicates a semantic class of a pixel in the medical image; and recognizing lesions in the medical image based on the semantic segmentation label. In the automatic pilot field, the image semantic segmentation model may be used to perform semantic segmentation on an image captured by a vehicle during driving, thereby recognizing and understanding a street view in the image to help an automatic pilot system to make driving decisions, etc. For example, an automatic pilot method may comprise: obtaining an image captured by a vehicle during driving; generating a semantic segmentation label of the image using a trained image semantic segmentation model, wherein the semantic segmentation label indicates a semantic class of a pixel in the image; recognizing a street view in the image based on the semantic segmentation label; and generating an automatic pilot decision based on the recognized result.

Figure 2:
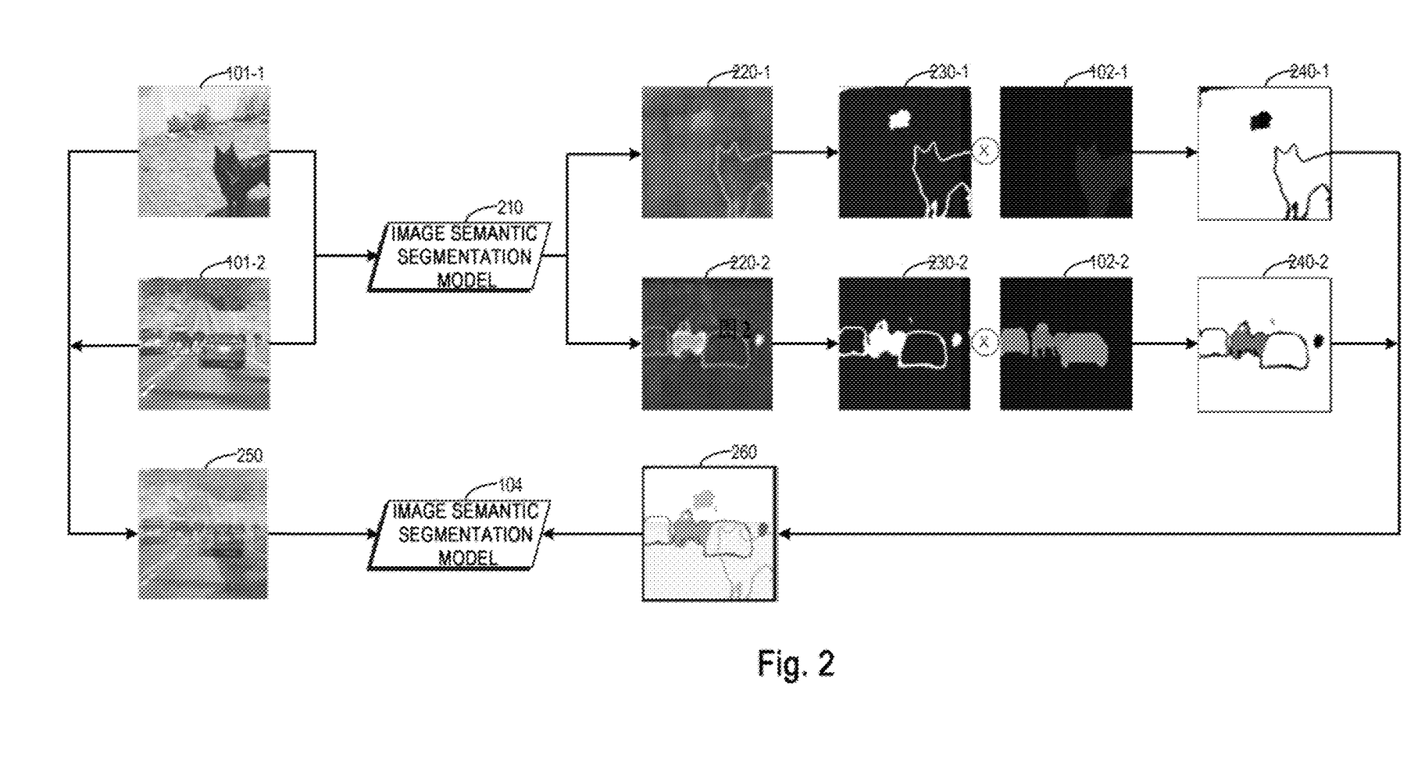
FIG. 2 shows a schematic diagram for image processing according to embodiments of the present disclosure.

Operations performed by the image processing apparatus 130 as shown in FIG. 1 will be described in detail with reference to FIG. 2. FIG. 2 shows a plurality of images 101-1 and 101-2 obtained from the set of images 101, wherein the image 101-1 has an annotated initial semantic segmentation label 102-1 and the image 101-2 has an annotated initial semantic segmentation label 102-2. Although FIG. 2 only shows one pair of images obtained from the image collection 101 for processing, it is to be understood that this is only for the purpose of illustration without suggesting any limitation on the scope of the present disclosure. In some embodiments, the image processing apparatus 130 may obtain more than two images from the set of images 101 for processing.

In some embodiments, as shown in FIG. 2, for each of the plurality of images 101 and 101-2, the image processing apparatus 130 may use an image semantic segmentation model 210 to predict respective semantic classes of a plurality of pixels in the image. The image semantic segmentation model 210 may be the same as or different with the image semantic segmentation model 104. For example, the image semantic segmentation model 210 may be a pre-trained image semantic segmentation model, a preliminarily trained image semantic segmentation model, or an image semantic segmentation model which has not been trained. That is, the image semantic segmentation model 210 may be implemented using a semantic segmentation model with lower prediction accuracy, or other algorithm or apparatus that can realize the function of semantic segmentation.

The image processing apparatus 130 may further determine respective scores of the plurality of pixels in each image based on a semantic prediction result of the image, wherein the score of each pixel may indicate a correlation level between the pixel and a target region in the image. In other words, the score of each pixel may indicate a contribution level of the pixel to the training of the image semantic segmentation model. As shown in FIG. 2, respective scores of a plurality of pixels in the image 101-1 may be represented by a heat map 220-1, and respective scores of a plurality of pixels in the image 101-2 may be represented by a heat map 220-2.

In some embodiments, for each pixel in each image, the image processing apparatus 130 may determine a score of the pixel based on a difference between a predicted semantic class of the pixel and a true semantic class of the pixel, wherein the true semantic class of the pixel is indicated by a semantic segmentation label 102 of the image. For example, the image semantic segmentation model 210 may predict a respective probability that each pixel in each image belongs to different semantic classes, and the annotated semantic segmentation label of the image may indicate a true semantic class to which each pixel belongs. The image processing apparatus 130 may calculate a loss between the probability predicted by the image semantic segmentation model 210 that each pixel belongs to its true semantic class and a predetermined probability value (e.g., 100%), as the score of each pixel. That is, the higher the score of a pixel, the larger the difference between the predicted semantic class and the true semantic class of the pixel.

Alternatively, in some embodiments, for each pixel in each image, the image processing apparatus 130 may determine the score of the pixel based on uncertainty or degree chaotic level (e.g., entropy) of the predicted semantic class of the pixel. For example, the image semantic segmentation model 210 may predict a respective probability that each pixel in each image belongs to different semantic classes. The image processing apparatus 130 may use any appropriate algorithm that is known or will be developed in future to determine the uncertainty or the chaotic level of a predicted semantic class of each pixel based on the respective predicted probability that the pixel belongs to different semantic classes, as the score of the pixel. That is, the higher the score of the pixel, the higher the uncertainty or the chaotic level of the predicted semantic class of the pixel.

In some embodiments, as shown in FIG. 2, the image processing apparatus 130 may determine an image mask 230-1 corresponding to the image 101-1 based on the heat map 220-1 that indicates respective scores of a plurality of pixels in the image 101-1. Similarly, the image processing apparatus 130 may determine an image mask 230-2 corresponding to the image 101-2 based on the heat map 220-2 that indicates respective scores of a plurality of pixels in the image 101-2.

In some embodiments, the image processing apparatus 130 may rank the scores of a plurality of pixels in each image in a decreasing order and then select top N % pixels or select pixels whose scores exceed a threshold score n. For example, the value of N % or n may be determined according to a verification experiment. The image processing apparatus 130 may generate an image mask of the image by setting a mask value at a position corresponding to the selected pixel as 1 and setting mask values at other positions as 0. Alternatively, in some embodiments, the image processing apparatus 130 may rank the scores of all pixels in a batch of images in a decreasing order and select top N % pixels or select pixels whose scores exceed the threshold score n. For example, the value of N % or n may be determined according to the verification experiment. The image processing apparatus 130 may generate an image mask of each image in the batch of images by setting a mask value at a position corresponding to the selected pixel as 1 and setting mask values at other positions as 0. Alternatively, in other embodiments, the image processing apparatus 130 may also directly use a heat map that indicates respective scores of a plurality of pixels in each image as an image mask of the image.

In some embodiments, as shown in FIG. 2, the image processing apparatus 130 may perform a masking operation (i.e., point multiplication) on the image mask 230-1 and the initial semantic segmentation label 102-1 of the image 101-1 to regenerate a semantic segmentation label 240-1 of the image 101-1. Similarly, the image processing apparatus 130 may perform a masking operation (i.e., point multiplication) on the image mask 230-2 and the initial semantic segmentation label 102-2 of the image 101-2 to regenerate a semantic segmentation label 240-2 of the image 101-2. As seen from FIG. 2, the regenerated semantic segmentation labels 240-1 and 240-2 respectively retain semantic segmentation labels in the initial semantic segmentation labels 102-1 and 102-2 corresponding to those pixels in the target regions and ignore semantic segmentation labels of those pixels in non-target regions.

In some embodiments, as shown in FIG. 2, the image processing apparatus 130 may further generate a mixed image 250 and its semantic segmentation label 260 based on the plurality of images 101-1 and 101-2 and the regenerated semantic segmentation labels 240-1 and 240-2. In some embodiments, the image processing apparatus 130 may determine a weighted sum of the plurality of images 101-1 and 101-2 based on respective weights of the plurality of images 101-1 and 101-2 to obtain the mixed image 250. The image processing apparatus 130 may determine a weighted sum of the semantic segmentation labels 240-1 and 240-2 based on respective weights of the plurality of images 101-1 and 101-2 to obtain the semantic segmentation label 260 of the mixed image 250. It is to be understood that the image processing apparatus 130 may also generate the mixed image 250 and its semantic segmentation label 260 in other way. The mixed image 250 and its semantic segmentation label 260 may be used as a training sample in the training dataset 103 shown in FIG. 1 to train the target semantic segmentation model 104.

Figure 3:
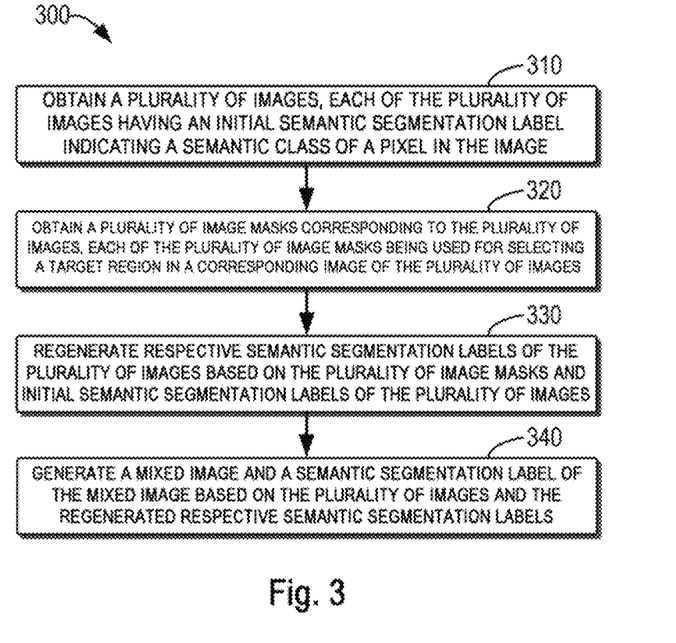
FIG. 3 shows a flowchart of an example method for image processing according to embodiments of the present disclosure.

FIG. 3 shows a flowchart of an example method 300 for image processing according to embodiments of the present disclosure. For example, the method 300 may be performed by the image processing apparatus 130 as shown in FIG. 1. The method 300 is to be described in conjunction with FIGS. 1 and 2. It is to be understood that the method 300 may further comprise an additional block that is not shown and/or may omit some blocks that are shown. The scope of the present disclosure is not limited in this regard.

At block 310, a plurality of images (e.g., the images 101-1 and 101-2 as shown in FIG. 2) are obtained, each of the plurality of images having an initial semantic segmentation label (e.g., the semantic segmentation labels 102-1 and 102-2 as shown in FIG. 2) that indicates a semantic class of a pixel in the image.

At block 320, a plurality of image masks (e.g., image masks 230-1 and 230-3 as shown in FIG. 2) corresponding to the plurality of images are obtained, each of the plurality of image masks being used for selecting a target region in a corresponding image of the plurality of images.

In some embodiments, obtaining a plurality of image masks corresponding to the plurality of images comprises: for a first image (e.g., the image 101-1 or 101-2 as shown in FIG. 2) of the plurality of images, determining respective predicted semantic classes of a plurality of pixels of the first image; determining respective scores (e.g., the heat map 220-1 or 220-2 as shown in FIG. 2) of the plurality of pixels based on the respective predicted semantic classes of the plurality of pixels, wherein a score of each pixel indicates a correlation level between the pixel and a target region in the first image; and determining a first image mask (e.g., the image mask 230-1 or 230-2 as shown in FIG. 2) of the first image based on the respective scores of the plurality of pixels, wherein the first image mask is used for selecting at least part of the plurality of pixels with higher scores.

In some embodiments, determining respective predicted semantic classes of a plurality of pixels in the first image comprises: determining respective predicted semantic classes of the plurality of pixels in the first image using an image semantic segmentation model (e.g., the image semantic segmentation model 210 as shown in FIG. 2).

In some embodiments, determining respective scores of a plurality of pixels in the first image comprises: for a first pixel of the plurality of pixels, determining a score of the first pixel based on a difference between a predicted semantic class of the first pixel and a semantic class of the first pixel, wherein the semantic class of the first pixel is indicated by a semantic segmentation label of the first image.

In some embodiments, determining respective scores of a plurality of pixels in the first image comprises: for a second pixel of the plurality of pixels, determining a score of the second pixel based on uncertainty of a predicted semantic class of the second pixel.

In some embodiments, determining respective scores of a plurality of pixels in the first image comprises: for a third pixel of the plurality of pixels, determining a score of the third pixel based on a chaotic level of a predicted semantic class of the third pixel.

At block 330, respective semantic segmentation labels (e.g., the semantic segmentation labels 240-1 and 240-2 as shown in FIG. 2) of the plurality of images are regenerated based on the plurality of image masks and initial semantic segmentation labels of the plurality of images.

In some embodiments, regenerating respective semantic segmentation labels of the plurality of images comprises: performing a masking operation on each of the plurality of image masks and an initial semantic segmentation label of a corresponding image of the plurality of images to regenerate a semantic segmentation label of the corresponding image.

At block 340, a mixed image (for example, the mixed image 250 as shown in FIG. 2) and a semantic segmentation label (for example, the semantic segmentation label 260 as shown in FIG. 2) of the mixed image are generated based on the plurality of images and the regenerated respective semantic segmentation labels.

In some embodiments, generating the mixed image and the semantic segmentation label of the mixed image comprises: determining a weighted sum of the plurality of images based on respective weights of the plurality of images to generate the mixed image; and determining a weighted sum of the regenerated respective semantic segmentation labels based on respective weights of the plurality of images to generate a semantic segmentation label of the mixed image.

Figure 4:
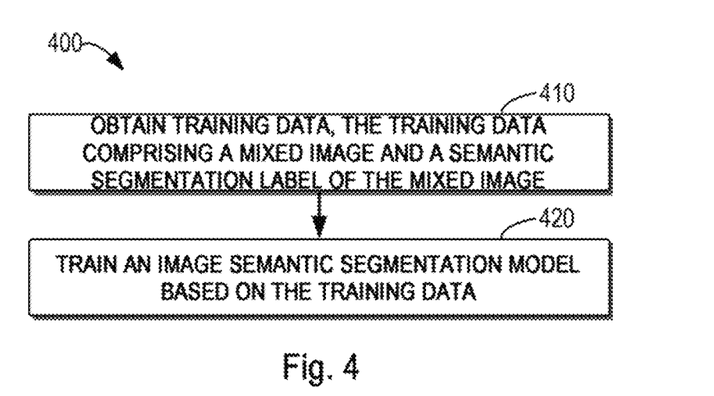
FIG. 4 shows a flowchart of an example method for model training according to embodiments of the present disclosure.

FIG. 4 shows a flowchart of an example method 400 for model training according to embodiments of the present disclosure. For example, the method 400 may be performed by the model training apparatus 140 as shown in FIG. 1. The method 400 is to be described in conjunction with FIGS. 1 and 2. It is to be understood that the method 400 may further comprise an additional block that is not shown and/or may omit some blocks that are shown. The scope of the present disclosure is not limited in this regard.

At block 410, training data is obtained. For example, the model training apparatus 140 may obtain the training data from the training dataset 103 as shown in FIG. 1. In some embodiments, the obtained training data may comprise a mixed image generated according to the above method 300 and its semantic label (e.g., the mixed image 250 and its semantic label 260 as shown in FIG. 2). In addition or alternatively, in some embodiments, the obtained training data may comprise an original image and its corresponding initial semantic segmentation label (e.g., the image 101 and its corresponding initial semantic segmentation label 102 as shown in FIG. 1).

At block 420, an image semantic segmentation model (e.g., the image semantic segmentation model 104 as shown in FIGS. 1 and 2) is trained based on the training data for generating a semantic segmentation label of a target image. In some embodiments, the model training apparatus 140 may perform model training based on the obtained training data to determine model parameters of the image semantic segmentation model 104.

Figure 5:
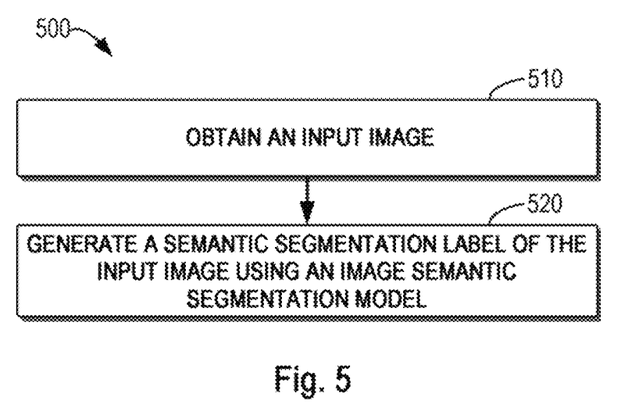
FIG. 5 shows a flowchart of an example method for image processing according to embodiments of the present disclosure.

FIG. 5 shows a flowchart of an example method 500 for image processing according to embodiments of the present disclosure. For example, the method 500 may be performed by the model application apparatus 150 as shown in FIG. 1. The method 500 is to be described in conjunction with FIGS. 1 and 2. It is to be understood that the method 500 may further comprise an additional block that is not shown and/or may omit some blocks that are shown. The scope of the present disclosure is not limited in this regard.

At block 510, an input image (e.g., the input image 105 as shown in FIG. 1) is obtained. At block 520, a semantic segmentation label (e.g., the semantic segmentation label 106 as shown in FIG. 1) of the input image is generated using an image semantic segmentation model, wherein the semantic segmentation label indicates a semantic class of a pixel in the input image. For example, the generated semantic segmentation label 106 may be a vector or an array that indicates a semantic class of each pixel in the input image 105, or may be a visual image as shown in FIG. 1, wherein pixels of different semantic classes may be filled with different colors.

Table 1 shows a performance comparison between image semantic segmentation models which are trained based on different solutions. Table 1 shows accuracies of image semantic segmentation models which are trained using solutions 1~4 based on the same training dataset.

TABLE 1

| Solution | Model Accuracy |
| --- | --- |
| Solution 1 | 77.56% |
| Solution 2 | 77.98% |

TABLE 1-continued

| Solution | Model Accuracy |
| --- | --- |
| Solution 3 | 78.98% |
| Solution 4 | 79.06% |

In Table 1, "Solution 1" represents a baseline solution, i.e., using an original image and its standard semantic segmentation label to train the image semantic segmentation model. "Solution 2" represents a traditional mixup operation solution. "Solution 3" and "Solution 4" are solutions according to embodiments of the present disclosure, wherein "Solution 3" generates an image mask for selecting a target region based on a loss between a predicted semantic class of a pixel and a true semantic class of the pixel, while "Solution 4" generates an image mask for selecting a target region based on a chaotic level (i.e., "entropy") of the predicted semantic class of the pixel. Table 1 shows average accuracies of respective solutions for image segmentation with respect to 20 predetermined semantic classes. The experimental data shown in Table 1 can prove that the solution according to embodiments of the present disclosure can effectively improve the performance of the trained image semantic segmentation model. For example, for each semantic class among the 20 predetermined semantic classes, the accuracy can increase by 1%~2%.

Besides semantic segmentation tasks, embodiments of the present disclosure can further be applicable to instance segmentation tasks. As described above, the objective of a semantic segmentation task is to recognize a semantic class to which each pixel in an image belongs. Unlike the semantic segmentation task, the objective of an instance segmentation task is to recognize an instance class to which each pixel in an image belongs. For example, the semantic segmentation task can classify pixels belonging to persons in the image into a same class, while the instance segmentation task can classify pixels in the image, which belong to different persons, into different classes.

In order to apply embodiments of the present disclosure to the instance segmentation task, the initial semantic label 102 annotated for each image 101 needs to indicate an instance class to which each pixel in the image belongs. For example, if semantic classes of two pixels are both persons but respectively correspond to different persons, then the two pixels will be annotated as belonging to different instance classes. Subsequent processing flow is similar to the above described processing flow for the semantic segmentation task, and thus will not be repeated here.

Figure 6:
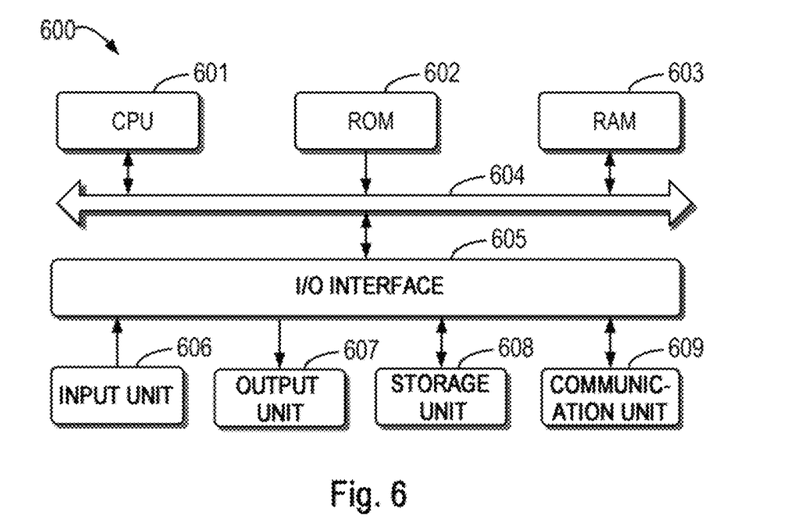
FIG. 6 shows a schematic block diagram of an example computing device which is applicable to implement embodiments of the present disclosure.

FIG. 6 shows a schematic block diagram of an example computing device 600 suitable for implementing embodiments of the present disclosure. For example, one or more apparatuses in the system 100 as shown in FIG. 1 may be implemented by the device 600. Examples of the device 600 may include any general-purpose computer, special-purpose computer, server, virtual machine, and any other electronic device with computing capability (such as user equipment, mobile phones, cellular phones, smart phones, personal digital assistants, image capture devices (such as digital cameras), gaming devices, music storage and playback devices, or Internet devices that enable wireless or wired Internet access and browsing, etc.).

As depicted, the device 600 comprises a central processing unit (CPU) 601 (also referred to as "processor 601") which may perform various appropriate actions and processes in accordance with computer program instructions stored in a read only memory (ROM) 602 or computer program instructions loaded from a storage unit 608 to a random access memory (RAM) 603. In the RAM 603, there are also stored various programs and data required by the device 600 when operating. The CPU 601, the ROM 602 and the RAM 603 are connected to one another via a bus 604. An input/output (I/O) interface 605 is also connected to the bus 804.

A plurality of components in the device 600 are connected to the I/O interface 605, comprising: an input unit 606, for example, a keyboard, a mouse, or the like; an output unit 607, such as various types of displays, a loudspeaker or the like; a storage unit 608, such as a disk, an optical disk or the like; and a communication unit 609, such as a LAN card, a modem, a wireless communication transceiver or the like. The communication unit 609 allows the device 600 to exchange information/data with other device via a computer network, such as the Internet, and/or various telecommunication networks.

The above-described procedures and processes, such as the methods 300, 400 and/or 500 may be executed by the processor 601. For example, in some embodiments, the methods 300, 400 and/or 500 may be implemented as a computer software program, which is tangibly embodied on a machine readable medium, e.g. the storage unit 608. In some embodiments, part or the entirety of the computer program may be loaded to and/or installed on the device 600 via the ROM 602 and/or the communication unit 609. The computer program, when loaded to the RAM 603 and executed by the CPU 601, may execute one or more acts of the methods 300, 400 and/or 500 as described above.

In some embodiments, a computing device comprises at least one circuitry configured to: obtain a plurality of images, each of the plurality of images having an initial semantic segmentation label indicating a semantic class of a pixel in the each image; obtain a plurality of image masks corresponding to the plurality of images, each of the plurality of image masks being used for selecting a target region in a corresponding image of the plurality of images; regenerate respective semantic segmentation labels of the plurality of images based on the plurality of image masks and initial semantic segmentation labels of the plurality of images; and generate a mixed image and a semantic segmentation label of the mixed image based on the plurality of images and the regenerated respective semantic segmentation labels.

In some embodiments, the at least one circuitry is configured to: for a first image of the plurality of images, determine respective predicted semantic classes of a plurality of pixels of the first image; determine respective scores of the plurality of pixels based on the respective predicted semantic classes of the plurality of pixels, wherein a score of each pixel indicates a correlation level between the each pixel and a target region in the first image; and determine a first image mask of the first image based on respective scores of the plurality of pixels, wherein the first image mask is used for selecting at least part of pixels with higher scores of the plurality of pixels.

In some embodiments, the at least one circuitry is configured to: determine respective predicted semantic classes of the plurality of pixels in the first image using an image semantic segmentation model.

In some embodiments, the at least one circuitry is configured to: for a first pixel of the plurality of pixels, determine a score of the first pixel based on a difference between a predicted semantic class of the first pixel and a semantic class of the first pixel, wherein the semantic class of the first pixel is indicated by a semantic segmentation label of the first image.

In some embodiments, the at least one circuitry is configured to: for a second pixel of the plurality of pixels, determine a score of the second pixel based on uncertainty of a predicted semantic class of the second pixel.

In some embodiments, the at least one circuitry is configured to: for a third pixel of the plurality of pixels, determine a score of the third pixel based on a chaotic level of a predicted semantic class of the third pixel.

In some embodiments, the at least one circuitry is configured to: perform a masking operation on each of the plurality of image masks and an initial semantic segmentation label of a corresponding image of the plurality of images to regenerate a semantic segmentation label of the corresponding image.

In some embodiments, the at least one circuitry is configured to: determine a weighted sum of the plurality of images based on respective weights of the plurality of images to generate the mixed image; and determine a weighted sum of the regenerated respective semantic segmentation labels based on respective weights of the plurality of images to generate a semantic segmentation label of the mixed image.

In some embodiments, a computing device comprises at least one circuitry configured to: obtain training data, the training data comprising a mixed image and a semantic segmentation label of the mixed image; and train, based on the training data, an image semantic segmentation model for generating a semantic segmentation label of a target image.

In some embodiments, a computing device comprises at least one circuitry configured to: obtain an input image; and use a trained image semantic segmentation model to generate a semantic segmentation label of the input image.

The present disclosure may be implemented as a system, a method, and/or a computer program product. When the present disclosure is implemented as a system, apart from being integrated on an individual device, the components described herein may also be set in the form of a cloud computing architecture. In a cloud computing environment, these components may be remotely arranged and may cooperate to implement the functions described by the present disclosure. The cloud computing may provide computation, software, data access and storage services without informing a terminal user of physical locations or configurations of systems or hardware providing such services. The cloud computing provides services via a Wide Area Network (such as Internet) using a suitable protocol. For example, the cloud computing provider provides, via the Wide Area Network, the applications, which can be accessed through a web browser or any other computing component. Components of the cloud computing and corresponding data may be stored on a server at a remote location. The computing resources in the cloud computing environment may be merged or spread at a remote datacenter. The cloud computing infrastructure may provide, via a shared datacenter, the services even though they are shown as a single access point for the user. Therefore, various functions described herein can be provided using the cloud computing architecture from a service provider at a remote location. Alternatively, functions may also be provided from a conventional server, or they may be mounted on a client device directly or in other ways. In addition, the present disclosure may further be implemented as a computer program product, which may include a computer-readable storage medium storing computer-readable program instructions thereon for carrying out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It is to be understood that each block of the flowchart illustrations and/or block diagrams, and combinations of blocks in the flowchart illustrations and/or block diagrams, can be implemented by computer readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It is also to be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

What is claimed is:

1. A method for image processing, comprising:
  obtaining a plurality of images, each of the plurality of images having an initial semantic segmentation label indicating a semantic class of a pixel in the each image;
  obtaining a plurality of image masks corresponding to the plurality of images, each of the plurality of image masks being used for selecting a target region in a corresponding image of the plurality of images;
  regenerating respective semantic segmentation labels of the plurality of images based on the plurality of image masks and initial semantic segmentation labels of the plurality of images; and
  generating a mixed image and a semantic segmentation label of the mixed image based on the plurality of images and the regenerated respective semantic segmentation labels,
  wherein obtaining a plurality of image masks corresponding to the plurality of images comprises:
  for a first image of the plurality of images, determining respective predicted semantic classes of a plurality of pixels of the first image;
  determining respective scores of the plurality of pixels based on respective predicted semantic classes of the plurality of pixels, wherein a score of each pixel indicates a correlation level between the each pixel and a target region in the first image; and
  determining a first image mask of the first image based on respective scores of the plurality of pixels, wherein the first image mask is used for selecting at least part of pixels with higher scores among the plurality of pixels.

2. The method according to claim 1, wherein determining respective predicted semantic classes of a plurality of pixels in the first image comprises:
  determining respective predicted semantic classes of the plurality of pixels in the first image using an image semantic segmentation model.

3. The method according to claim 1, wherein determining respective scores of a plurality of pixels in the first image comprises:
  for a first pixel of the plurality of pixels, determining a score of the first pixel based on a difference between a predicted semantic class of the first pixel and a semantic class of the first pixel, wherein the semantic class of the first pixel is indicated by a semantic segmentation label of the first image.

4. The method according to claim 1, wherein determining respective scores of a plurality of pixels in the first image comprises:
  for a second pixel of the plurality of pixels, determining a score of the second pixel based on uncertainty of a predicted semantic class of the second pixel.

5. The method according to claim 1, wherein determining respective scores of a plurality of pixels in the first image comprises:
  for a third pixel of the plurality of pixels, determining a score of the third pixel based on a chaotic level of a predicted semantic class of the third pixel.

6. The method according to claim 1, wherein regenerating respective semantic segmentation labels of the plurality of images comprises:
  performing a masking operation on each of the plurality of image masks and an initial semantic segmentation label of a corresponding image of the plurality of images to regenerate a semantic segmentation label of the corresponding image.

7. The method according to claim 1, wherein generating a mixed image and a semantic segmentation label of the mixed image comprises:
determining a weighted sum of the plurality of images based on respective weights of the plurality of images to generate the mixed image; and
determining a weighted sum of the regenerated respective semantic segmentation labels based on respective weights of the plurality of images to generate a semantic segmentation label of the mixed image.

8. The method according to claim 1, further comprising:
obtaining training data, the training data comprising the mixed image and the semantic segmentation label of the mixed image; and
training, based on the training data, an image semantic segmentation model for generating a semantic segmentation label of a target image.

9. The method according to claim 8, further comprising:
obtaining an input image; and
generating a semantic segmentation label of the input image using the trained image semantic segmentation model.

10. A computing device, comprising:
at least one processor, configured to:
obtain a plurality of images, each of the plurality of images having an initial semantic segmentation label indicating a semantic class of a pixel in the each image;
obtain a plurality of image masks corresponding to the plurality of images, each of the plurality of image masks being used for selecting a target region in a corresponding image of the plurality of images;
regenerate respective semantic segmentation labels of the plurality of images based on the plurality of image masks and initial semantic segmentation labels of the plurality of images; and
generate a mixed image and a semantic segmentation label of the mixed image based on the plurality of images and the regenerated respective semantic segmentation labels,
wherein the at least one processor is configured to:
for a first image of the plurality of images, determine respective predicted semantic classes of a plurality of pixels of the first image;
determine respective scores of the plurality of pixels based on respective predicted semantic classes of the plurality of pixels, wherein a score of each pixel indicates a correlation level between the each pixel and a target region in the first image; and
determine a first image mask of the first image based on respective scores of the plurality of pixels, wherein the first image mask is used for selecting at least part of pixels with higher scores among the plurality of pixels.

11. The computing device according to claim 10, wherein the at least one processor is configured to:
determining respective predicted semantic classes of the plurality of pixels in the first image using an image semantic segmentation model.

12. The computing device according to claim 10, wherein the at least one processor is configured to:
for a first pixel of the plurality of pixels, determine a score of the first pixel based on a difference between a predicted semantic class of the first pixel and a semantic class of the first pixel, wherein the semantic class of the first pixel is indicated by a semantic segmentation label of the first image.

13. The computing device according to claim 10, wherein the at least one processor is configured to:
for a second pixel of the plurality of pixels, determine a score of the second pixel based on uncertainty of a predicted semantic class of the second pixel.

14. The computing device according to claim 10, wherein the at least one processor is configured to:
for a third pixel of the plurality of pixels, determine a score of the third pixel based on a chaotic level of a predicted semantic class of the third pixel.

15. The computing device according to claim 10, wherein the at least one processor is configured to:
perform a masking operation on each image mask of the plurality of image masks and an initial semantic segmentation label of a corresponding image of the plurality of images to regenerate a semantic segmentation label of the corresponding image.

16. The computing device according to claim 10, wherein the at least one processor is configured to:
determine a weighted sum of the plurality of images based on respective weights of the plurality of images to generate the mixed image; and
determine a weighted sum of the regenerated respective semantic segmentation labels based on respective weights of the plurality of images to generate a semantic segmentation label of the mixed image.

17. The computing device according to claim 10, wherein the at least one processor is configured to:
obtain training data, the training data comprising the mixed image and the semantic segmentation label of the mixed image; and
train, based on the training data, an image semantic segmentation model for generating a semantic segmentation label of a target image.

18. The computing device according to claim 17, wherein the at least one processor is configured to
obtain an input image; and
generate a semantic segmentation label of the input image using the trained image semantic segmentation model.

* * * * *